United States Patent [19]
Everaarts

[11] 4,214,206
[45] Jul. 22, 1980

[54] DIGITAL TRANSMISSION SYSTEM HAVING DIRECT BIT EXTRACTION FROM SCRAMBLED BIT STREAMS

[75] Inventor: Klaas Everaarts, Hilversum, Netherlands

[73] Assignee: U.S. Philips Corporation, New York, N.Y.

[21] Appl. No.: 934,824

[22] Filed: Aug. 18, 1978

[30] Foreign Application Priority Data

Sep. 27, 1977 [NL] Netherlands ........................ 7710503

[51] Int. Cl.$^2$ .......................................... H04B 7/155
[52] U.S. Cl. ...................................................... 375/4
[58] Field of Search .................... 325/1, 2, 10, 13, 17; 179/15 AD, 15 AC, 15 AF; 178/69.1

[56] References Cited

U.S. PATENT DOCUMENTS

| | | | |
|---|---|---|---|
| 3,590,380 | 6/1971 | Zegers | 325/13 |
| 3,962,635 | 6/1976 | Roza | 325/13 |
| 4,095,053 | 6/1978 | Duttweiler | 179/15 AF |
| 4,151,373 | 4/1979 | Widmer | 179/15 AF |

OTHER PUBLICATIONS

"RD-3 Long-Haul High Capacity Digital Radio" Proceedings of the World Telecommunication Forum Geneva 1975 3.2.1.1–3.2.1.5, Oct. 75.
"A 1.5 to 6 Megabit Digital Multiplex Employing Pulse Stuffing" Bruce, International Conf. on Comm. Jun. 1969, p. 34-1-7.

Primary Examiner—Robert L. Griffin
Assistant Examiner—Michael A. Masinick
Attorney, Agent, or Firm—Thomas A. Briody; Jack Oisher; James J. Cannon, Jr.

[57] ABSTRACT

Direct bit extraction from a scrambled bit stream for a digital transmission system in which a bit stream is divided into consecutive transmission frames, extra bits are inserted in given bit position of each transmission frame, the bit stream is scrambled in a transmitter terminal station and transmitted via a plurality of regenerative repeaters to a receiver terminal station in which the transmitted bit stream is descrambled and the inserted extra bits are selected from the bit stream. Both the scrambler and the descrambler include a generator for generating a given fixed scramble pulse pattern and a transmission clock pulse counter which, on attaining its final counting position, supplies a setting pulse which adjusts the pulse pattern generators in the scrambler and the descrambler to an initial generation state. By choosing a fixed relation between this final counting position and the number of bit positions per transmission frame it is possible to select with simple means the extra bits, inserted in the consecutive transmission frames, in the repeaters and the receiver terminal station without the necessity of first descrambling the received scrambled bit stream.

3 Claims, 10 Drawing Figures

DIGITAL TRANSMISSION SYSTEM HAVING DIRECT BIT EXTRACTION FROM SCRAMBLED BIT STREAMS

BACKGROUND OF THE INVENTION

1. Field of the Invention

This invention relates to a digital transmission system of the type having a plurality of regenerative repeaters which together form a digital link between a transmitter terminal station and a receiver terminal station, these terminal stations each comprising associated digital peripheral equipment, the transmitter peripheral equipment comprising means for dividing the bit stream to be transmitted into consecutive transmission frames having a fixed number of bit positions and for inserting at least one extra bit in a given bit position of each of the consecutive transmission frames, the transmitter peripheral equipment furthermore comprising a scrambler in which the bit stream thus obtained is combined modulo-2 with a scramble pulse pattern for generating a scrambled bit stream for transmission via the digital link and the receiver peripheral equipment comprising a descrambler for descrambling the scrambled bit stream derived from the digital link, this receiver peripheral equipment furthermore comprising means for selecting the extra bit inserted into the consecutive transmission frames.

2. Description of the Prior Art

A digital transmission system of the above mentioned type is known from, an article by Pierre E. Hervieux, entitled "RD-3 Long-Haul High Capacity Digital Radio" published in "Proceedings of the World Telecommunication Forum", Geneva 1975. In such a digital transmission system scrambling of the bit stream to be transmitted is used for facilitating the recovery of the clock pulse signals from the transmitted bit stream and to reduce the line spectrum and to make this spectrum more uniform.

However, a drawback of this scrambling is that, inter alia for monitoring the digital connection, extra bits inserted into the bit stream cannot be extracted from the transmitted bit stream until after this bit stream has been descrambled. Therefore, in practice, it is customary for economic reasons to monitor the digital connection in only one of several regenerative sections instead of in each regenerative repeater. However, this entails the drawback that if a regenerative repeater arranged for monitoring gives an alarm, a fault localization procedure must be performed thereafter to ascertain which of the regenerative sections preceding the monitored repeater does not function properly.

SUMMARY OF THE INVENTION

It is an object of the invention to provide a digital transmission system of the type specified in the preamble, in which the extra bits added to the bit stream are extracted from the bit stream in each of the regenerative repeaters in a simple and, therefore, economically justified manner.

The digital transmission system according to the invention is therefore characterized in that both the transmitter and the receiver peripheral equipment include a transmission clock pulse counter having a final counting position which is in a fixed relation to the number of bit positions per transmission frame, which counters supply a setting pulse in the final counting position, and in addition both the scrambler and the descrambler are provided with a pulse pattern generator for generating a given fixed scramble pulse pattern, these pulse pattern generators being adjusted by the setting pulse of said counters to a given initial generation state, and in that the regenerative repeaters and the receiver peripheral equipment include means for selecting the extra bits inserted into the consecutive transmission frames, on the basis of said fixed relationship between the final counting position and the number of bit positions per transmission frame, said selection means in the receiver peripheral equipment also supplying synchronization pulses for synchronizing the transmission clock pulse counter in the receiver peripheral equipment with that in the transmitter peripheral equipment.

When using such a system, the need for descrambling in the regenerative repeaters is avoided and the extra bits are nevertheless selected in a reliable manner from the bit stream.

BRIEF DESCRIPTION OF THE DRAWINGS

Embodiments of the invention and their advantages will now be further explained with reference to the drawings, in which.

DESCRIPTION OF THE PREFERRED EMBODIMENT

Figure 1:
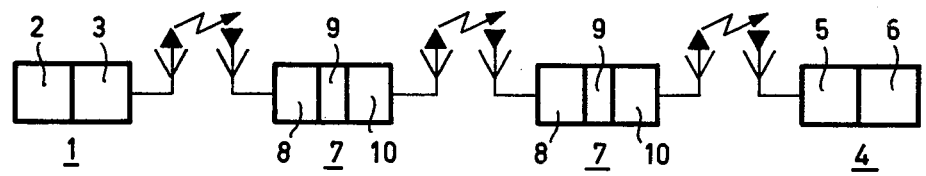
FIG. 1 is a general block diagram of a digital transmission system for the transmission of a bit stream via a radio link.

The digital transmission system shown in FIG. 1 comprises a transmitter station 1 with associated digital peripheral equipment 2 and a radio transmitter 3, a receiver terminal station 4 with a radio receiver 5 and associated digital peripheral equipment 6, and a number of regenerative repeaters 7, each having a radio receiver 8, a regenerative section 9 and a radio transmitter 10.

Figure 2A:
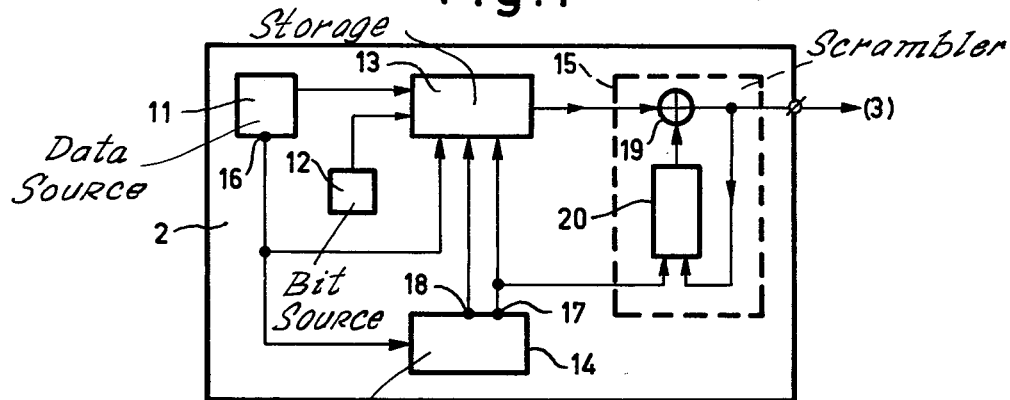
FIG. 2a, FIG. 2b and FIG. 2c respectively show the transmitter peripheral equipment, the regenerative section of a repeater and the receiver peripheral equipment of the system of FIG. 1 when this system is arranged in known manner.
Figure 2B:
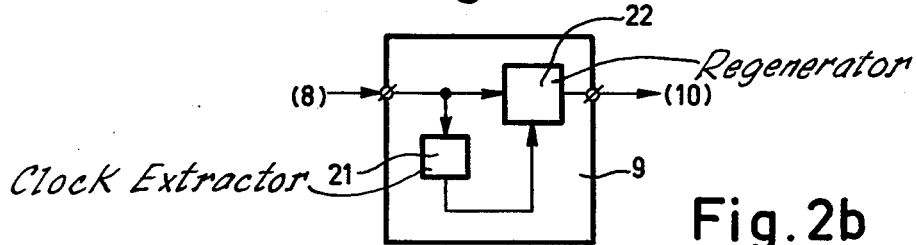
Figure 2C:
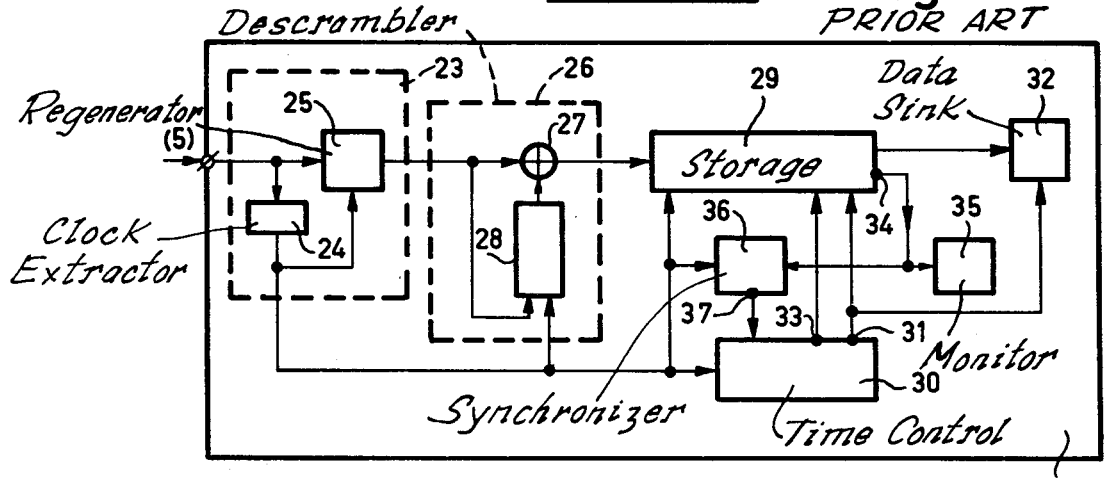

FIG. 2a, FIG. 2b and FIG. 2c show, respectively the block diagrams of the transmitter peripheral equipment 2, the regenerative section 9 of the repeaters 7 and the receiver peripheral equipment 6 of the system in FIG. 1 if this system is arranged in known manner.

As shown in FIG. 2a, the transmitter peripheral equipment 2 comprises a data source 11 and a source 12 for supplying extra bits, these two sources 11, 12 being connected to an elastic store 13. In addition, this peripheral equipment comprises a time control circuit 14 and a self-synchronizing scrambler 15 connected to the elastic store 13. The bit stream supplied by data source 11 is entered into elastic store 13 under the control of a data clock signal available at an output 16 of data source 11. This data clock signal is also applied to time control circuit 14 which generates from this data clock signal a transmission clock signal which is available at an output 17 and has a somewhat higher frequency than the data clock frequency. This transmission clock signal is applied to elastic store 13 for controlling the reading-out of the written-in data bits. As reading-out is done at a somewhat higher frequency than writing-in, extra bits can be added to the data bit stream in elastic store 13. The latter also occurs under the control of time control circuit 14 which, to this end, divides the bit stream to be transmitted into consecutive transmission frames each having a fixed number of bit positions and which furthermore supplies command pulses via an output 18 to elastic store 13 to add the extra bits of source 12 to the data bit stream in such a manner that at least one extra bit is inserted into a given bit position of each of the consecutive transmission frames.

The bit stream occurring at the output of elastic store 13 with extra inserted bits is thereafter applied to a self-synchronising scrambler 15 where it is modulo-2 combined in a modulo-2 adder 19 with a scramble pulse pattern to produce a scrambled bit stream for transmission via the radio link. As is known, in a scrambler 15 of the self-synchronizing type, the scramble pulse pattern is obtained by feeding back the scrambled bit stream at the output of modulo-2 adder 19 to its second input via a circuit 20 having a plurality of shift register elements and one or more modulo-2 adders for forming the modulo-2 sum of differently-delayed versions of the scrambled bit stream. The shift register elements in circuit 20 receive the transmission clock signal at output 17 of time control circuit 14 as a shift signal. Further particulars regarding such a self-synchronizing scrambler and the associated descrambler are, for example, disclosed in U.S. Pat. No. 3,421,146.

The scrambled bit stream thus obtained is modulated in radio transmitter 3 as a digital signal on a carrier for transmission to radio receiver 5 via the repeaters 7. In each of the repeaters 7 the carrier-modulated digital signal is first demodulated in radio receiver 8 to enable regeneration of the bit stream in regenerative section 9. As shown in FIG. 2b, this regenerative section 9 comprises a clock extractor 21 for recovering the transmission clock signal from the bit stream and a regenerator 22 for regenerating the bit stream under the control of the recovered transmission clock signal. The regenerated bit stream is again carrier-modulated in the radio transmitter 10 connected to the regenerative section 9 for onward transmission. The carrier-modulated digital signal is again demodulated in radio receiver 5 of receiver terminal station 4 and the bit stream thus obtained is thereafter applied to peripheral equipment 6. Clock extractor 21 and regenerator 22 are disclosed in U.S. Pat. No. 3,421,146.

As shown in FIG. 2c, the receiver peripheral equipment 6 also comprises a regenerative section 23 having a transmission clock extractor 24 and a regenerator 25, which is controlled by the output of extractor 24, in which the received bit stream is regenerated. Connected to the output of regenerator 25 there is a self-synchronizing descrambler 26 with a modulo-2 adder 27 in which the regenerated bit carrier is modulo-2 combined with a scramble pulse pattern derived in the same manner as in the transmitter peripheral equipment 2 of FIG. 2a from the scrambled bit stream by means of a circuit 28 which is identical to the circuit 20 in FIG. 2a and is connected between the two inputs of modulo-2 adder 27. As the scramble pulse pattern in scrambler 15 and descrambler 26 are obtained in an identical manner from the same scrambled bit stream these two scramble pulse patterns will also be identical apart from any transmission errors in the radio link, so that the descrambled bit stream at the output of modulo-2 adder 27 is consequently identical to the bit stream at the input of modulo-2 adder 19 in FIG. 2a.

In FIG. 2c this descrambled bit stream is written into an elastic store 29 under the control of the recovered transmission clock signal at the output of transmission clock extractor 24. This transmission clock signal is also applied to a time control circuit 30, which generates from this transmission clock signal the data clock signal which is available at an output 31 and which is applied to elastic store 29 for controlling the reading of the entered data bits. The data bit stream thus obtained is passed on, together with the data clock signal at output 31 of time control circuit 30, to a data sink 32 for further processing. Also the selection of the extra bits inserted into the consecutive transmission frames is done under the control of time control circuit 30 which, to this end, supplies command pulses via an output 33 to elastic store 29 for reading the inserted extra bits separately. These extra bits are available at an output 34 of elastic store 29 and are applied to a monitor 35 for monitoring the bit error rate, this monitor 35 giving an alarm when a prescribed value of the bit error rate is exceeded. These extra bits are also applied, via output 34 of elastic store 29, to a synchronizing circuit 36 to which also the recovered transmission clock signal is applied for generating a synchronizing signal available at an output 37 and used for synchronizing time control circuit 30 with the transmission frames of the descrambled bit stream.

From this description of receiver peripheral equipment 6 in FIG. 2c, it follows that the inserted extra bits can similarly be derived in regenerative section 9 of each repeater 7, shown in FIG. 2b, from the bit stream but that, to this end, a self-synchronizing descrambler must be used in each repeater 7, which is a drawback, inter alia for economic reasons.

Figure 3A:
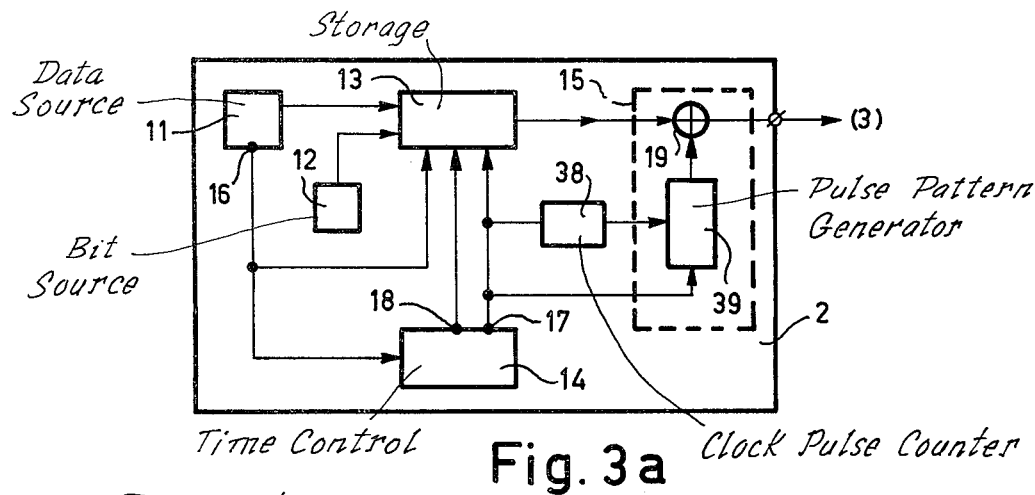
FIG. 3a, FIG. 3b and FIG. 3c show an embodiment of the transmitter peripheral equipment, the regenerative section of a repeater and the receiver peripheral equipment respectively of the system in FIG. 1 when this system is arranged in accordance with the invention.
Figure 3B:
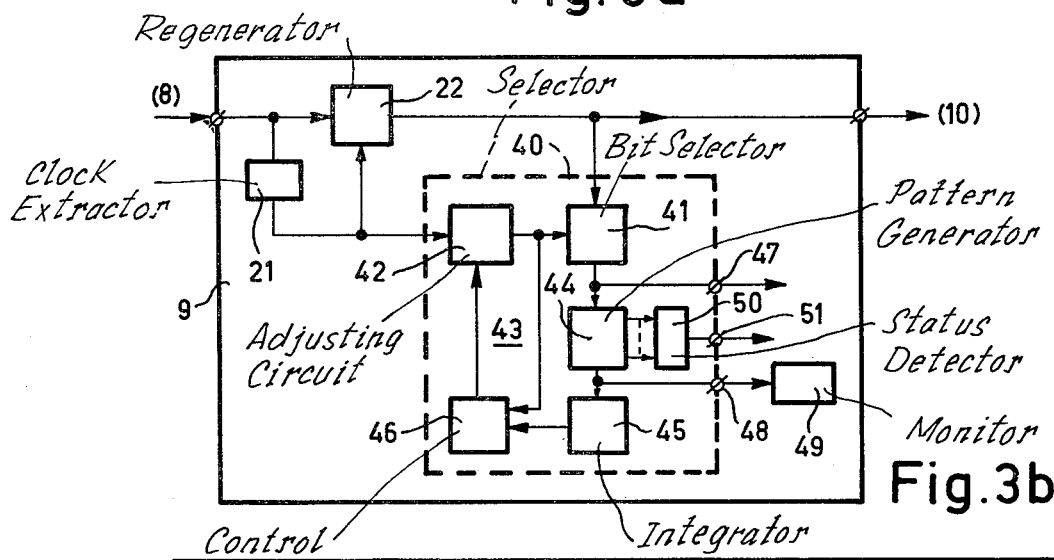
Figure 3C:
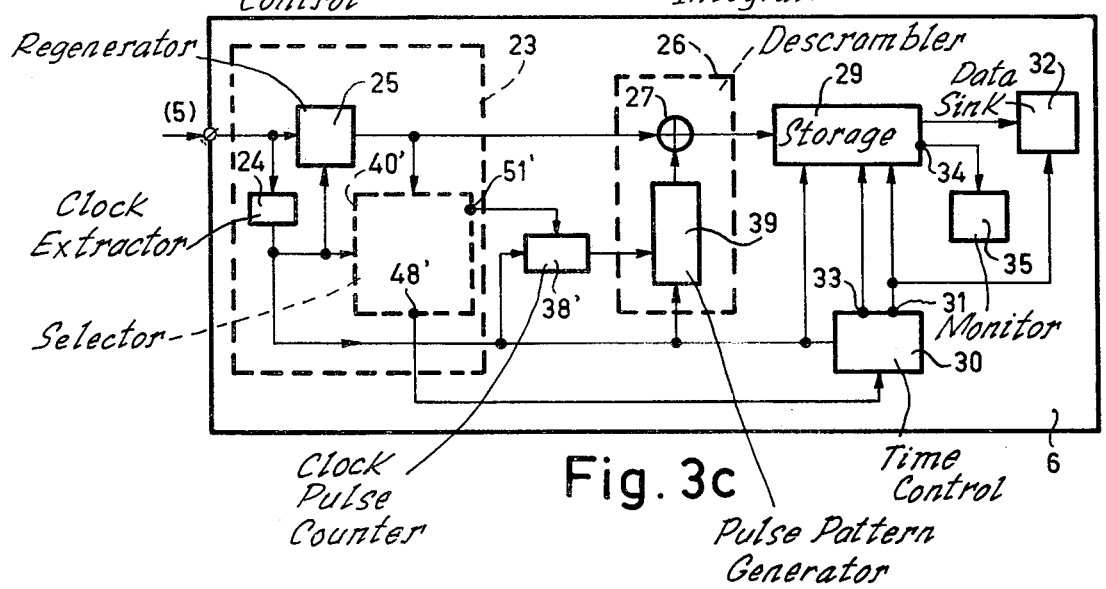

However, this drawback is mitigated to a great extent if the digital transmission system in FIG. 1 is arranged in accordance with the invention; FIG. 3a, FIG. 3b and FIG. 3c showing for this case the block diagram of an embodiment of the transmitter peripheral equipment 2, the regenerative section 9 of the repeaters 7 and the receiver peripheral equipment 6 respectively.

In a transmission system according to the invention both the transmitter peripheral equipment 2 (FIG. 3a) and the receiver peripheral equipment 6 (FIG. 3c) include a transmission clock pulse counter 38, 38' having a final counting position which is in a given fixed relation to the number of bit positions per transmission frame, these counters 38, 38' supplying a setting pulse in the final counting position; and, furthermore, both the scrambler 15 (FIG. 3a) and the descrambler 26 (FIG. 3c) include a pulse pattern generator 39, 39' for generating a given fixed scramble pulse pattern; these pulse pattern generators 39, 39' being adjusted by the setting pulse of said counters 38, 38', to a given initial generation state. In addition, both the regenerative sections 9 (FIG. 3b) of the repeaters 7 and the receiver peripheral equipment 6 (FIG. 3c) include means for selecting the extra bits, inserted into the successive transmission frames, on the basis of said fixed relation between the final counting position and the number of bit positions per transmission frame, these selection means in the receiver peripheral equipment 6 (FIG. 3c) also supplying selection synchronising pulses for synchronising transmission clock pulse counter 38' in this peripheral equipment 6 with transmission clock pulse counter 38 in the transmitter peripheral equipment 2 (FIG. 3a).

The identical sections of transmitter peripheral equipment 2 in FIG. 3a and in FIG. 2a have been given the same reference numerals. The peripheral equipment 2 shown in FIG. 3a also comprises a data source 11, a source 12 for supplying extra bits to be inserted into the consecutive transmission frames, an elastic store 13, a time control circuit 14 and a scrambler 15 having a modulo-2 adder 19. Peripheral equipment 2 in FIG. 3a, however, differs from that in FIG. 2a in two respects. Firstly, it further includes a transmission clock pulse counter 38 for counting the clock pulses in the transmission clock signal of time control circuit 14, this counter 38 having a final counting position C with a given fixed relation to the number F of bit positions per transmission frame. Secondly, scrambler 15 is now not of the self-synchronizing type, but comprises a pulse pattern generator 39 which is adjusted to an initial generation state $S_1$ by a setting pulse of counter 38 on attaining its final counting position C. This pulse pattern generator 39 is controlled by the transmission clock pulse signal of time control circuit 14 and, when the setting pulse of counter 38 is left out of consideration, this generator 39 generates a periodic binary pulse pattern and cycles through a cycle of P different generation states $S_1, S_2, \ldots S_p$ in the rhythm of the clock pulses. Such pulse pattern generators are usually implemented as a shift register having a number P of elements and a modulo-2 feedback logic. With a suitable choice of this module-2 feedback logic the number P of the generation states and, consequently, also of the bit positions of the generated pulse pattern, is equal to $2^p - 1$ for p shift register elements, the pulse pattern generator being known in this case as a maximum-length linear shift register. Further particulars concerning properties and implementations of such a generator for generating a prescribed pulse pattern are disclosed in, for example, the book "Digital Communications with Space Applications", edited by Solomon W. Golomb, published by Prentice-Hall, Inc., Englewood Cliffs, N.J., 1964, in chapter 2 and appendix 3 in particular. The ultimte number of bit positions of the fixed scramble pulse pattern generated by generator 39 depends on the choice of the final counting position C, counter 38 supplying a setting pulse which adjusts generator 39 to its initial generation state $S_1$. If C is smaller than or equal to P, this ultimate number of bit positions is equal to C and generator 39 cycles through a cycle of C generation states $S_1, S_2, \ldots, S_C$.

The given fixed relation between the final counting position C of transmission clock pulse counter 38 and the number F of bit positions per transmission frame can be chosen in several ways. For explaining the operation of transmitter peripheral equipment 2 in FIG. 3a *it is now assumed, by way of non-limitative example, that*

$C = P = n$ $F = n + 1$ and that the extra bits, inserted as a test bit in a given position of consecutive transmission frames, all have the same binary value. If now pulse pattern generator 39 is in a given generation state for the test bit position of a certain transmission frame, this generator 39 will just be in the next generation state for the test bit position of the next transmission frame, so that the test bit positions of consecutive transmission frames always coincide with consecutive generation states in the cycle of pulse pattern generator 39. For the scrambled bit stream at the output of modulo-2 adder 19 this results in that the bits in the test bit position of consecutive transmission frames form a pattern equal to the scramble pulse pattern of generator 39 for extra bits, inserted as test bits, having a binary value "0" and equal to the logic inverted scramble pulse pattern for extra bits, inserted as test bits having a binary value "1". As this scramble pulse pattern is fully prescribed (in contradistinction to the scramble pulse pattern of the self-synchronising scrambler in FIG. 2a which, as mentioned previously, is also determined by the preceding bits in the bit stream to be scrambled), the bits in the test bit positions of the scrambled bit stream at the output of scrambler 15 in FIG. 3a also form a fully prescribed pattern, so that this test bit pattern can be recognized in a simple manner.

Figure 4:
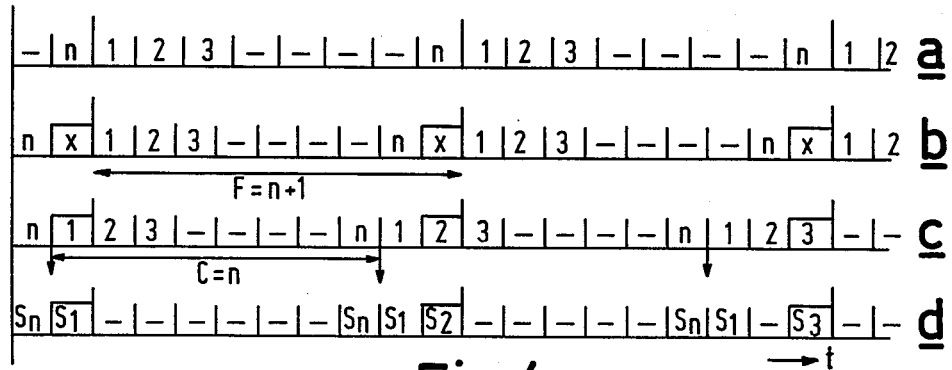
FIG. 4 shows some time diagrams for explaining the operation of the transmitter peripheral equipment in FIG. 3a for a first choice of the fixed relation between the final counting position of the transmission clock pulse counter and the number of bit positions per transmission frame.

The above-described operation of transmitter peripheral equipment 2 in FIG. 3a is illustrated by the time diagrams of FIG. 4. Time diagram a in FIG. 4 shows the bit stream of data source 11 which is entered synchronously with the data clock signal into elastic store 13. Under the control of time control circuit 14 consecutive transmission frames of $F = (n+1)$ bits are formed wherein 1 extra bit is added as a test bit to each of the consecutive groups of n data bits of time diagram a in a given bit position. Time diagram b in FIG. 4 shows the bit stream which is read in synchronism with the transmission clock signal from elastic store 13 for the case that a test bit, denoted by x, is inserted in bit position $(n+1)$ of each transmission frame. Time diagram c in FIG. 4 shows the counting position of transmission clock pulse counter 38 and, by means of arrows, also the instants at which counter 38, after attaining its final counting position $C = n$, supplies a setting pulse to pulse pattern generator 39. As a result of the chosen relation between final counting position C and the number F of bit positions per transmission frame, this setting pulse occurs each time one bit position earlier in a next transmission frame. Time diagram d in FIG. 4 shows the consecutive generation states $S_1, S_2, \ldots, S_n$ of pulse pattern generator 39 which is each time adjusted to its initial generation state $S_1$ by a setting pulse of counter 38. It appears from the time diagrams b and d that the first test bit x coincides with generation state $S_1$, the second test bit x with generation state $S_2$, etc.. In the scrambled bit stream the bits occurring in bit position $(n+1)$ of consecutive transmission frames consequently form a periodic test bit pattern which, depending on the chosen binary value for test bit x, is equal to the fixed scramble pulse pattern of generator 39 or to the logic inversion thereof. The period of this fixed test bit pattern is equal to the number of transmission frames of $F = (n+1)$ bit positions, corresponding to the final counting position $C = n$.

By using the described measures in the transmitter peripheral equipment 2 of FIG. 3a the test bit pattern in bit position (n+1) of the transmission frames of the scrambled bit stream is therefore fully predetermined. This test bit pattern can therefore be selected in a simple manner from the scrambled bit stream, utilizing the techniques which are known per se for selecting a divided synchronizing bit pattern from time division multiplex signals without the necessity to descramble the scrambled bit stream.

The generative sections 9 and 23 of the repeaters 7 (FIG. 3b) and the receiver peripheral equipment 6 (FIG. 3c) respectively, comprise accordingly a selector arrangement 40, 40' connected to the output of the transmission clock extractors 21, 24 and regenerators 22, 25, already present. These selection arrangements 40, 40' can be implemented in many different ways. FIG. 3b shows, by way of example, an implementation of selection arrangement 40 in the regenerative section of the repeaters 7, which is particularly suitable for test bit patterns in the form of maximum-length linear shift register series, i.e. where n is the maximum number of bits and p is the number of shift register stages, $n = 2^p - 1$. In FIG. 3b this selection arrangement 40 comprises a bit selector 41, connected to the output of regenerator 22, for selecting the bits in a given bit position of the consecutive transmission frames and an adjusting circuit 42, connected to the output of transmission clock extractor 21, for bit selector 41. If the test bit pattern in a given bit position of the transmission frames has been found, this adjusting circuit 42 is blocked, but if the test bit pattern has not yet been found or has got lost, this adjusting circuit 42 adjusts bit selector 41 each time to a different bit position of the transmission frames until the bit position for the test bit is found. Connected to the output of bit selector 41 there is a pattern detection circuit 43 having a pattern converter 44, an integrator 45 for the converted pattern and a control circuit 46 connected to integrator 45 and supplying a blocking signal for adjusting circuit 42 if the output signal of integrator 45 exceeds a given threshold within a time interval which is also determined by the period of the test bit pattern. In general, pattern converter 44 converts a random bit pattern, originating from bit selector 41, into a likewise random pulse pattern, but converts the test bit pattern only into a series of equidistant pulses. Integration of this last series of pulses in integrator 45 results in a signal exceeding the threshold of control circuit 46 within said time interval. This threshold is chosen so that also a prescribed limited number of bit errors may be allowed in the test bit pattern without resulting in an adjustment of bit selector 41 to another bit position of the transmission frames. Further particulars regarding this selection arrangement 40 and the pattern converters 44 included therein are disclosed in U.S. Pat. No. 3,619,510.

By means of this selection arrangement 40 in FIG. 3b it is possible to derive different signals in a simple manner from the regenerated scrambled bit stream after the bit position of the test bit in the transmission frames has been found. Thus, the test bit pattern itself is available at an output 47 which is connected to the output of bit selector 41. In addition a signal which is particularly suitable for error monitoring is available at an output 48 which is connected to the output of pattern converter 41. Since any bit errors in the test bit pattern cause corresponding pulses to be missing in the series of normally equidistant pulses at the output of pattern converter 44, a monitor 49, connected to output 48 for supervising the bit error rate, need only ascertain that these pulses are missing and can, therefore, be implemented in a very simple manner. Finally, it is possible to find not only the bit position of the test bit in each transmission frame, but also the phase relation of the periodic test bit pattern relative to the consecutive transmission frames. This is because there is a fixed relation between the test bit pattern and the scramble pulse pattern of pulse pattern generator 39 in FIG. 3a and, therefore, also a fixed phase relation between the test bit pattern and the cycle of generation states $S_1, S_2, \ldots S_n$ of generator 39. It can now be proved that with a suitable implementation of pattern converter 44 (cf. last-mentioned U.S. Pat. No. 3,619,510) a pulse can be derived once in each period of the test bit pattern, by means of a status detector 50 connected to pattern converter 44, which pulse indicates the bit position of, for example, generation state $S_n$ in the transmission frame then occurring, and therefore also the phase relation of the test bit pattern relative to the consecutive transmission frames. These pulses, derived from status detector 50, are available at an output 51 of selection arrangement 40 in FIG. 3b.

The last-mentioned possibility will usually not be utilized in the regenerative repeaters 7, but it is utilized in the receiver peripheral equipment 6 shown in FIG. 3c. The corresponding sections of peripheral equipment 6 in FIG. 3c and FIG. 2c have been given the same reference numerals. As specified above, the regenerative section 23 of peripheral equipment 6 in FIG. 3c also comprises a selection arrangement 40' which can be implemented in the same manner as selection arrangement 40 in FIG. 3b and which is therefore not shown in detail in FIG. 3c. The pulses available at output 51' (indicating once per period of the test bit pattern the bit position of, for example, generation state $S_n$ and, consequently, the desired counting position of transmission clock pulse counter 38') are used for synchronising this counter 38' with transmission clock pulse counter 38 in transmitter peripheral equipment 2 of FIG. 3a. As also the pulse pattern generators 39, 39' in scrambler 15 of FIG. 3a and descrambler 26 of FIG. 3c are identical, the scramble pulse pattern of modulo-2 adders 19, 27 will also be identical. The sections of the receiver peripheral equipment 6 in FIG. 3c which follow descrambler 26 are different from those in FIG. 2c in that synchronizing circuit 36 of FIG. 2c is not provided in FIG. 3c, because its task can be fulfilled by selection arrangement 40'. This is because the signal available at output 48' is normally formed by a series of equidistant pulses occurring in the test bit position of the consecutive transmission frames and which can, consequently, be used for synchronizing time control circuit 30 with the transmission frames.

In the preceding explanation it is assumed that the extra bits, inserted as test bits from source 12 in FIG. 3a, all have the same binary value. In addition, by way of example, the relation $C = F - 1$ is chosen between the final counting position C of transmission clock pulse counters 38, 38' and the number F of the bit positions per transmission frame. It is also possible to chose other fixed relations between C and F, while maintaining the above-mentioned assumption. Thus, the relation $C = F + 1$ results, for example, in a test bit pattern which is equal to the time-inverted scramble pulse pattern of pulse pattern generator 39 for inserted extra bits having a binary value "0", and equal to the logic inversion of the time-inverted scramble pulse pattern for inserted extra bits having a binary value "1", as can be checked in a simple manner. The above-mentioned assumption can be maintained in a more general manner if C and F have no common factors and, consequently, form a pair of relative prime numbers.

However, it is alternatively possible to chose other relations between C and F suitable for practical application in the present transmission system, if the above-mentioned assumptions are abandoned. A highly suitable relation is, for example, $C=F$. If this relation is applied in the transmitter peripheral equipment 2 of FIG. 3a for $F=(n+1)=C$, this means that the test bit positions of consecutive transmission frames always coincide with one given generation state $S_x$ of pulse pattern generator 39. In this case source 12 in FIG. 3a is formed by a generator for supplying a pseudo-random bit pattern, for example a maximum-length linear shift register series. For the scrambled bit stream at the output of modulo-2 adder 19 this results in that the bits in the test bit positions of consecutive transmission frames form a pattern which is equal to the fixed pseudo-random bit pattern of source 12 or to the logic inversion thereof, depending on the binary value of the bit in the fixed scramble pulse pattern associated with this generation state $S_x$ of pulse pattern generator 39. Also in this case the test bit pattern is fully prescribed, so that it can be selected, in the manner already elaborated above, in regenerative sections 9, 23 of repeaters 7 and receiver peripheral equipment 6 by means of selection arrangements 40, 40', which are arranged for this test bit pattern.

Figure 5:
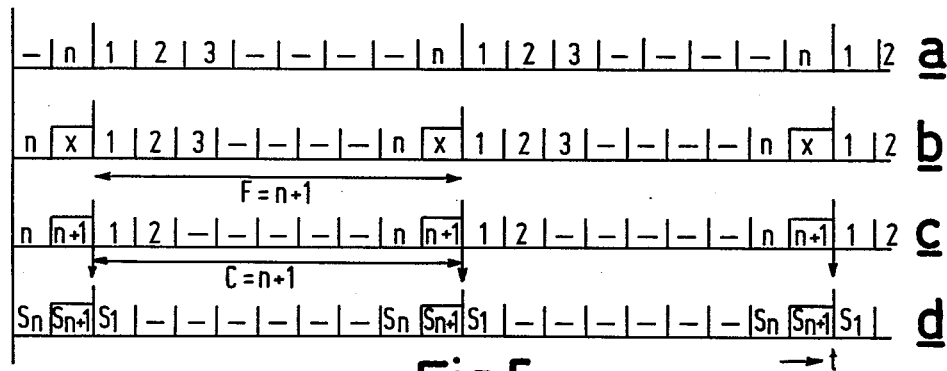
FIG. 5 shows some time diagrams for explaining the operation of the transmitter peripheral equipment in FIG. 3a for a second choice of the above-mentioned fixed relation.

The abovedescribed operation of transmitter peripheral equipment 2 in FIG. 3a is illustrated by the time diagrams of FIG. 5. Time diagrams a and b in FIG. 5 correspond to time diagrams a and b in FIG. 4 and show, respectively, the bit stream of data source 11 which is entered into elastic store 13 and the bit stream which is read from elastic store 13 in synchronism with the transmission clock signal for the case that a test bit denoted by x is inserted in bit position $(n+1)$ of each transmission frame. In contradistinction to FIG. 4, the test bits x in consecutive transmission frames of FIG. 5 do not have the same binary value, but they form the fixed pseudo-random bit pattern of source 12. Time diagram c in FIG. 5 shows the counting position of transmission clock pulse counter 38 and, by means of arrows, the instants at which this counter 38, after having attained its final counting position $C=(n+1)$, supplies a setting pulse to pulse pattern generator 39. These instants need not of necessity coincide with the beginning of each of the transmission frames, but in practice this coincidence would be preferred because then also the setting pulse for adjusting pulse generator 39 to its initial generation state $S_1$ can be derived from the counter information already present in time control circuit 14 for dividing the bit stream into transmission frames having $F=(n+1)$ bit positions per transmission frame and the separate transmission clock pulse counter 38 can therefore be dispensed with. Time diagram d in FIG. 5 shows the consecutive generation states $S_1, S_2, \ldots S_{n+1}$ of pulse pattern generator 39. From time diagrams b and d it is obvious that the test bits x in the consecutive transmission frames always coincide with the same generation state $S_{n+1}$ of pulse pattern generator 39.

As in this case the test bit patterns in the bit stream to be scrambled and the scrambled bit stream are either indentical or the logic inversions of one another, which (in contradistinction to the case explained with reference to FIG. 4) consequently also applies to the descrambled bit stream, the information for synchronizing the transmission clock pulse counter 38' in the receiver peripheral equipment 6 can be derived from the descrambled bit stream.

Figure 6:
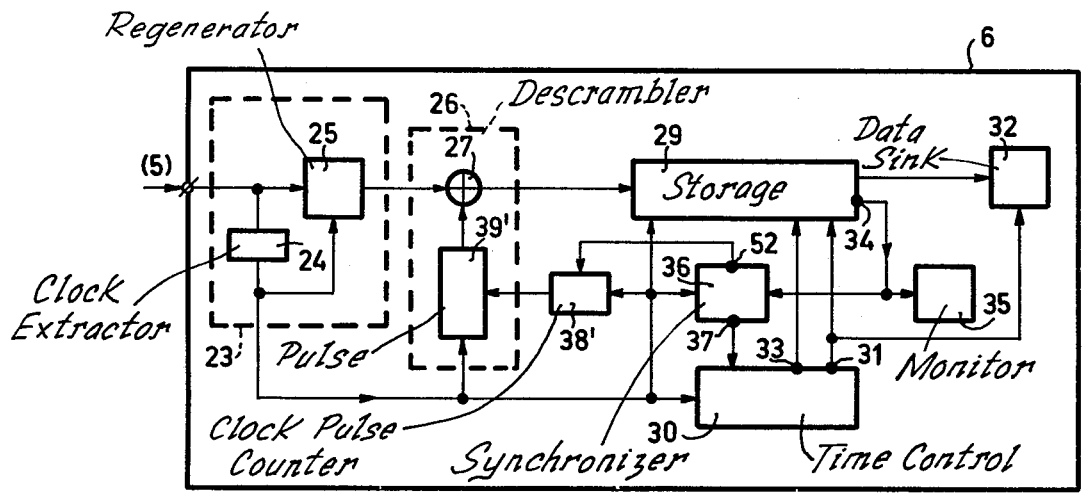
FIG. 6 shows a variant of the receiver peripheral equipment of FIG. 3c for the second choice, explained with reference to FIG. 5, of the above-mentioned fixed relation.

FIG. 6 shows a variant of receiver peripheral equipment 6 in FIG. 3c in which the last-mentioned possibility is utilized. Corresponding sections of peripheral equipment 6 in FIG. 6 and FIG. 3c have been given the same reference numerals. In the embodiment of FIG. 6 selection arrangement 40' of FIG. 3c in regenerative section 23 is not present, but on the other hand synchronizing circuit 36 of FIG. 2c is present, because the task of selection arrangement 40' of FIG. 3c can in this case be fully performed by this synchronizing circuit 36 in conjunction with elastic store 29 and time control circuit 30. It appears from FIG. 6 that this implementation of peripheral equipment 6 corresponds to a very large extent with the known implementation shown in FIG. 2c. However, the implementation of FIG. 6 differs from that of FIG. 2c in that a transmission clock pulse counter 38' is present in FIG. 6 which adjusts a pulse pattern generator 39' to its initial generation state $S_1$ on attaining its final counting position $C=(n+1)$. This synchronizing circuit 36 can be implemented in a similar manner to selection arrangements 40, 40' in repeaters 7 of FIG. 3b and peripheral equipment 6 of FIG. 3c. A signal for synchronising transmission clock pulse counter 38' in FIG. 6 with transmission clock pulse counter 38 in FIG. 3a is then present at an output 52 of synchronizing circuit 36. If the setting pulses of transmission clock pulse counter 38 coincide with the beginning of each of the transmission frames, the setting pulse for adjusting pulse pattern generator 39' to its initial generation state $S_1$ can also be derived from time control circuit 30 so that the separate transmission clock pulse counter 38' can be dispensed with in peripheral equipment 6, which, for that matter, is also the case with transmission clock pulse counter 38 in peripheral equipment 2, as mentioned already.

The preceding explanation applies to the relation $C=F$ between the final counting position C of transmission clock pulse counter 38 and the number F of the bit positions per transmission frame, but also applies mutatis mutandis if the relation $C=F/m$, m being an integer, is chosen, because then again the test bits x in the consecutive transmission frames also coincide with the same generation state $S_x$ of pulse pattern generator 39, as can be easily checked.

Summarizing the above, the described digital transmission system offers considerable advantages. For example, when using the described measures it is not only possible to select the extra bits, inserted by way of test bits, from the scrambled bit stream without descrambling and to use these test bits for supervising the regenerative section preceding the relevant repeater but it is also possible, if it is found that this preceding regenerative section does not function properly, to suppress the received test bits in the regenerated bit stream and to replace them by alarm bits in the bit position intended for these test bits. By chosing for these alarm bits an alarm bit pattern which is characteristic of the relevant repeater the receiver terminal station can, on receipt of this characteristic alarm bit pattern, ascertain without further error localization that the regenerative section preceding the relevant repeater does not function properly. In addition, the above-described transmission system utilizes a type of scrambler and descrambler which does not introduce bit error multiplication, this in contradistinction to the self-synchronizing scrambler and descrambler used in prior art transmission systems which do cause a bit error multiplication.

What is claimed is:

1. An improved digital transmission system with direct bit extraction from a scrambled bit stream, said transmission system having a plurality of regenerative repeaters constituting a digital link between a transmitter terminal station and a receiver terminal station, each terminal station having associated digital peripheral equipment, the transmitter peripheral equipment including means for dividing the bit stream to be transmitted into consecutive transmission frames having a fixed number of bit positions and for inserting at least one extra bit in a given bit position of each of the consecutive transmission frames, said transmitter peripheral equipment furthermore including a scrambler in which said bit stream divided into consecutive transmission frames having a fixed number of bit positions and at least one extra bit added in a given bit position of each consecutive transmission frame is combined modulo-2 with a scramble pulse pattern for generating a scrambled bit stream for transmission by said digital link and reception by said receiver, said receiver peripheral equipment including a descrambler for descrambling the transmitted scrambled bit stream received from the digital link, said receiver peripheral equipment furthermore including means for selecting extra bits inserted into the consecutive transmission frames, wherein the improvement comprises:

a transmission clock pulse counter in said transmitter and in said receiver peripheral equipment for counting clock pulses in said means for dividing said bit stream, said counters having a final counting position in a given fixed relation to the number of bit positions per transmission frame;

said clock pulse counters supplying a setting pulse in their final counting position;

a pulse pattern generator in said scrambler and descrambler adjusted to an initial generation state by a setting pulse from said clock pulse counter for generating a given fixed scramble pulse pattern;

said regenerative repeaters and said receiver peripheral equipment including:

selection means for selecting the extra bits inserted in said consecutive transmission frames on the basis of said fixed relation between the final counting position of said clock pulse counters and the number of bit positions per transmission frame;

said selection means in said receiver peripheral equipment also supplying synchronizing pulses for synchronizing the transmission clock pulse counter in the receiver peripheral equipment with that in the transmitter peripheral equipment.

2. An improved digital transmission system as claimed in claim 1, wherein the extra bits inserted in a given bit position of each of the consecutive transmission frames all have the same binary value, and the final counting position of the transmission clock pulse counter and the number of bit positions per transmission frame form a pair of relative prime numbers.

3. An improved digital transmission system as claimed in claim 1, wherein the extra bits inserted into a given bit position of each of the consecutive transmission frames form a fixed and periodic pseudo-random bit pattern, and the final counting position of the transmission clock pulse counter is equal to the number of bit positions per transmission frame or a submultiple thereof.

* * * * *